May 13, 1969    M. M. PATTERSON ET AL    3,443,639
METHOD FOR CONSOLIDATING AN UNCONSOLIDATED
SAND WITH A PLASMA JET STREAM
Filed Nov. 24, 1967

INVENTORS:
MAURICE M. PATTERSON
MICHAEL PRATS
BY: *Louis J Bovasso*
THEIR ATTORNEY

United States Patent Office 3,443,639
Patented May 13, 1969

3,443,639
METHOD FOR CONSOLIDATING AN UNCONSOLIDATED SAND WITH A PLASMA JET STREAM
Maurice M. Patterson and Michael Prats, Houston, Tex., assignors to Shell Oil Company, New York, N.Y., a corporation of Delaware
Filed Nov. 24, 1967, Ser. No. 685,471
Int. Cl. E21b *33/13, 43/11*
U.S. Cl. 166—288          6 Claims

ABSTRACT OF THE DISCLOSURE

A method for consolidating unconsolidated sand disposed in earth formations adjacent the cased portion of a cased subterranean well. An ionized gas device is positioned in the cased portion of the well at a depth adjacent to an unconsolidated sand within the earth formations. A jet stream of ionized gas is directed from the device through the cased portion and into the unconsolidated sand until sand melting along the intergranular contacts converts the adjacent portion of the sand to a porous consolidated formation.

BACKGROUND OF THE INVENTION

Field of the invention

This invention relates to a method for consolidating loose and unconsolidated subterranean formations, such as sand, and relates more particularly to a method for consolidating subterranean sand formations penetrated by a well.

Description of the prior art

In the production of fluid, such as petroleum, from an underground reservoir, it is often desirable to consolidate loose or incompetent formations without rendering them impermeable. Often the petroleum-producing formations penetrated by a borehole are of such a nature that, when the fluid flows into the borehole, substantial amounts of the grains or particles of the unconsolidated formations are also carried into the hole. This necessitates the use of some device, such as a liner, to prevent undesired entrainment of the particles in the production fluid. However, such devices have the disadvantage of becoming plugged with particles after a period of use and requiring cleaning to maintain the porosity thereof.

In various prior processes, a thermosetting resin is injected into the unconsolidated formation to act as a binding agent therefor. However, in such processes, a cased well must be perforated prior to the consolidating treatment. In other prior processes, the formations are exposed to a temperature high enough to melt and fuse all of the formation constituents. However, such methods have the disadvantage that most components of natural subterranean formations fuse at very high temperatures that exceed the temperatures attainable with borehole electric or gas fired heaters. Such methods have the further disadvantage that, owing to the fact that it is extremely difficult to obtain a uniformly high temperature throughout the formation being thus treated, the resulting condition of the treated formation varies from complete fusion and devitrification along the face of the formation to an unconsolidated state within a few inches into the formation.

A plasma is an ionized gas containing about equal numbers of positive ions and electrons. It is generated by energizing a gas until the bond between an atom and its electron is broken. The free electrons collide with one another, with ions, and with neutral atoms. These collisions generate radiant energy and raise the temperature of the gas into the range of 15,000–30,000° F.

Various specialized applications of the plasma-jet principle, such as material-coating and plate cutting devices, are now commercially available. Plasma jet torches have been used to cut metal as illustrated by patents to Gage and Karbovitz, Ser. No. 2,858,411 and 3,004,137, respectively. A patent to Carpenter, Ser. No. 2,680,487, discloses using a jet of hydrogen peroxide and steam for perforating a well casing. However, hydrogen peroxide and steam, or oxygen and acetylene, metal-cutting torches generate temperatures of only about 1,000° F., i.e., temperatures well below the melting point of sand grains. At temperatures of about 1,000° F. to 2,000° F., fusion of the sand grains of an unconsolidated sand does not occur.

Summary of the invention

It is an object of this invention to consolidate an unconsolidated sand disposed within an earth formation adjacent the cased portion of a cased subterranean well at an extremely high temperature in a relatively short time while simultaneously perforating the casing of the well.

It is a further object to fuse the grains of sand together so as to produce large lumps of sand having sufficient porosity to permit the flow of well fluids, but too large to flow into the well.

It is a still further object to glaze the surfaces of the grains of loose sand of the unconsolidated sand so as to form a hard, solid, homogeneous cementing material similar to glass at the intergranular contacts.

The teachings of this invention are carried out by positioning an ionized gas device in a cased portion of a well at a depth adjacent to an unconsolidated sand within the earth formations traversed by the well. A jet stream of ionized gas is directed from the device through the cased portion of the well and into the unconsolidated sand. The fluid in the borehole is preferably pressurized to cause a flow of fluid from the well through the cased portion and into the unconsolidated sand by maintaining an overpressure within the well. The jet stream is maintained at an extremely high temperature until at least a portion of surfaces of sand grains in the unconsolidated sand are melted so that sand is consolidated by a solidification of melted sand into an intergranular cementing material.

Description of the preferred embodiment

Figure 1:
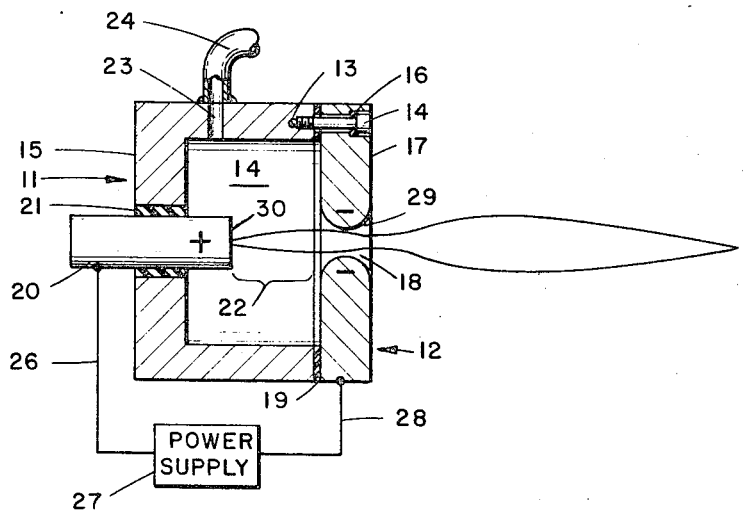
FIGURE 1 is a partly schematic sectional view of a device for generating a jet stream in accordance with the teachings of the invention.

A plasma is generated by supplying electric energy to an ionized gas. Ionized gas has a high rate of conductivity. Ionization takes place when such a gas is passed through an electric arc or an induction coil. A plasma jet operates at low voltages, such as 10 to 100 volts, but high currents, such as 100 to 1000 amps, and is designed to heat such gases to extremely high temperatures. Thus, a plasma jet is a high-velocity, high-momentum, high-heat transfer device. A plasma generator 11 is illustrated in FIGURE 1 which is capable of achieving temperatures in the range of 20,000° F. Generator 11 includes a closed substantially cylindrical housing 12 having a cylindrical side wall 13 and a rear wall 15. Front wall 17 preferably comprises a circular disk having a relatively small central hole 18 extending therethrough. Of course, housing 12 and front wall 17 can have other configurations, if desired. Front wall 17 forms the cathode of the plasma generator 11 and is insulated from wall 13 by insulation 19 where wall 17 abuts against wall 13. Front wall 17 is secured to side wall 13 by suitable means, such as a bolt 14 insulated from wall 17 at 16 and threaded into a mating hole 16 in wall 13. An elongated bar or rod 20 extends through a central opening 21 in back wall 15. Rod 20 forms the anode of the plasma generator 11 and is preferably insulated from wall 15 by insulation 21. In this manner, the walls of housing 12, other than front wall 17, may be of any suitable electrically non-conductive material. Rod 20 and cathode 17 are preferably of sutiable electrically conductive material, such as steel, carbon or tungsten.

Figure 2:
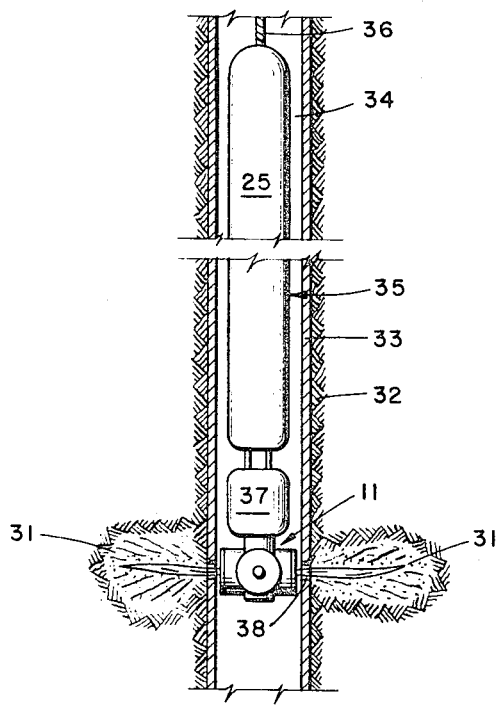
FIGURE 2 is a vertical sectional view of a preferred embodiment using the device of FIGURE 1.

Rod 20 is aligned with hole 18 in wall 17 and separated from wall 17 by a suitable air gap 22. A passageway 23 preferably extends through the top of wall 13 in communication with agas inlet 24 coupled to a suitable gas supply 25 (FIGURE 2). Rod 20 (FIGURE 1) is coupled through lead line 26 to a suitable power supply 27. A lead line 28 couples power supply 27 to the front wall or cathode 17. Hole 18 includes inwardly tapering walls 29 to assist in creating a "pinch effect" to gas exiting from housing 12 as will be discussed further hereinbelow.

In operation, a relatively inert gas, such as argon, nitrogen, helium, etc., is injected by any suitable control means through gas inlet 24, passageway 23 and into the interior of housing 12. This gas passes into the air gap 22 between the anode 20 and cathode 17. Simultaneously, electric current from power supply 27 is applied, again by any suitable control means, to the electrodes 17 and 20. The electric energy ionizes the gas between the electrodes 17 and 20, and the plasma flows in a jet stream out through the hole 18 in the cathode wall 17 as seen in FIGURE 2.

A pinch effect (FIGURE 2) is caused by a self-induced magnetic field around the plasma jet stream. This pinch effect constricts the jet away from the hole 18 in cathode wall 17. The plasma jet stream also rotates on the front surface 30 of anode 20. Such rotation is caused by vortex gas flow and prevents the arc from standing on one spot during discharge. Both above mentioned effects result in a substantial lessening of wear on the anode and cathode.

Although a specific type of plasma generator has been disclosed, many types and configurations are well known in the art. For example, the January 1960 issue of "Research/Development" devoted considerable space to a discussion of plasma jets in an article beginning no page 5, entitled, "The Plasma Jet and its Uses," by Merle L. Thorpe. This article discusses in detail the various types of arrangements necessary to reach temperatures from 3,000° F. to 60,000° F.

FIGURE 2 shows a preferred apparatus 35 for using the plasma jet generator 11 of FIGURES 1 and 2 for consolidating an unconsolidated sand 31 disposed in earth formations 32 adjacent the casing 33 of a cased subterranean well 34.

The surface components for well 34 have been omitted in FIGURE 2 for convenience of illustration. In a preferred procedure, a fluid pressure overbalance is maintained within the well while the casing is being perforated. The fluid pressure overbalance can be created by means well known in the art and thus further comment is deemed unnecessary. The well 34 may be emptied of liquid to the depth at which the casing is to be perforated, but this is not essential.

Apparatus 35 is preferably lowered by means of a cable 36 coupled to a winch (not shown) located at the surface of well 34. Cable 36 is of sufficient strength to raise and lower apparatus 35 within well 34 and includes the necessary power lines from the surface for actuating the various elements of apparatus 35.

The gas supply 25, such as a helium supply tank, is coupled to a subsurface control unit 37 for the plasma jets which is housed between the gas supply and a plurality of plasma jet generators 11. Unit 37 contains the necessary controls to start the arc for generators 11, time and stop the plasma flow and the system contains means to determine the depth below surface of generators 11 as is well known in the art. Four generators 11 spaced approximately 90° apart allow perforation of four holes in the casing 33 at each depth interval at which the apparatus 35 is operated. Three such generators are shown in FIGURE 2; however, it is to be understood that a fourth generator is located behind the center generator 11. Further, the particular number and placement of generators depends on various considerations, such as cost, amount of unconsolidated sand, efficiency of the generator, etc.

Power supplies for the plasma generators 11 are located at the surface. For example, a D.C. generator (not shown) capable of producing 100 kilowatts of power, may be used. Thus, the surface controls (not shown) are used to turn on the power when the apparatus 35 reaches its proper depth. The subsurface control unit 37 starts the introduction of gas into the housings 12 and thus directs jets of plasma out of the housings 12, through casing 33, formation 32 and into the unconsolidated sand 31. The extremely high temperature of the plasma jet, as for example where the gas is nitrogen or helium thus enabling temperatures in the vicinity of 60,000° F. to be reached, perforates casing 33 and any cement or other grouting around the casing and fuses the unconsolidated sand grains together. This fusion produces large lumps of sand having sufficient porosity to permit the flow of well fluids, but too large to flow into the well 34. While the casing 33 is being perforated by the plasma jets, an overpressure is preferably maintained within the well so that no production of fluids from the formation 32 occurs. Accordingly, a suitable well fluid is preferably pumped into the well so as to maintain an overpressure within well 34 and retain the permeability of the passageway from the well 34 to the sand. As to the latter, however, communication may be re-established or improved by fracturing the fused sand.

The extremely high temperature of the plasma may also be used to glaze the loose sand and thus form a hard, solid, homogeneous surface similar to glass. If this surface does not have sufficient cracks to permit flow, it may be necessary to crack the glazed sand as by fracturing.

In addition to fusing the unconsolidated sand by the extremely high temperature of the plama jet, a sand consolidating compound, which may be an inorganic cementing material such as a powdered metal (e.g. aluminum or nickel) may be deposited between the grains of sand simultaneous with the melting by the plasma jet and the pumping of the well fluid. This may be accomplished by providing a separate powdered stream of such compound which is mixed with the ionized gas prior to or during its injection into the housings 12.

Alternatively, or in addition to glazing the loose sand by means of the extremely high temperature of the plasma jet, a glazing material such as a ceramic may be entrained in the plasma jet stream in the manner discussed above concerning the consolidating compound and fitted into the unconsolidated sand. Simultaneously with the introduction of the glazing material, the inorganic cementing material mentioned above may be deposited between the grains of sand. In both cases, only one element is introduced in the plasma stream and that is the consolidating or glazing compound. Any of these materials can be introduced by an input to line 24 or a separate input into housing 12.

The extremely high heat of the plasma generator is necessary since fusion of the sand grains does not occur at lower temperatures, as for example, temperatures around 2,000° F. If the sand grains are fused, treatment times for recovering hydrocarbons from the earth formations adjacent the well are significantly reduced.

When fluid is injected into the earth formations from the well during the sand fusing operation, the fluid can be gas or a mixture of liquid and gases. Fluids are preferably introduced through the perforations as soon as they are made by the plasma generator. When fluid is injected into the formations, it is preferably a gas that is displaced from the casing through the perforations into the formation.

The plasma jet of this invention can also be used to drill rocks within an underground well. Thus, when the plasma jet is directed downwardly in well 34, the jet stream melts and vaporizes the rocks. The generator may be mounted on the end of the drill pipe with the power cables running inside the pipe. The vaporized rock solidifies into small particles as it comes into contact with the drilling mud which then carries these particles to the surface.

Although a specific embodiment of the invention has been disclosed, obvious changes in the invention are considered to fall within the limits of the following claims.

We claim as our invention:

1. A method for using an ionized gas device to consolidate an unconsolidated sand adjoining a cased portion of a cased subterranean well having fluid therein, the method comprising the steps of:
   positioning said ionized gas device in the cased portion of the well at a depth adjacent to said unconsolidated sand;
   directing a jet stream of ionized gas from said device through the cased portion of the well and into the unconsolidated sand;
   maintaining said flow of jet stream of ionized gas at temperature for a time period sufficient to melt at least a portion of the surfaces of said grains in said unconsolidated sand; and
   consolidating the sand by cooling said melted sand to form an intergranular bonding material.

2. The method of claim 1 including the additional step of maintaining a flow of fluid from the well into the sand during the melting of portions of the sand.

3. The method of claim 2 including the steps of:
   entraining a glazing material in the jet stream while directing said jet stream into the consolidated sand until at least a portion of said consolidated sand is glazed,
   subsequently cracking said glazed sand; and
   pumping a well fluid from said well through said cracked glazed sand.

4. The method of claim 1 wherein the step of maintaining said jet stream at an extremely high temperature includes maintaining said jet stream at a temperature above 2,000° F.

5. The method of claim 1 wherein the step of introducing a gas capable of being ionized includes introducing a gas capable of being ionized to a temperature above 20,000° F.

6. The method of claim 1 wherein the step of consolidating said melted sand includes the step of depositing inorganic cementing material between grains of sand while melting said sand while pumping fluid into the sand so as to maintain the porosity of said sand.

References Cited

UNITED STATES PATENTS

| | | | |
|---|---|---|---|
| 1,361,282 | 12/1920 | Nolan | 166—25 |
| 2,816,735 | 12/1957 | Dalinda et al. | 175—16 X |
| 3,004,137 | 10/1961 | Karlovitz | 175—16 X |
| 3,093,197 | 6/1963 | Freeman et al. | 175—17 X |
| 3,122,212 | 2/1964 | Karlovitz | 175—16 X |
| 3,245,721 | 4/1966 | Margiloff | 175—16 X |

STEPHEN J. NOVOSAD, *Primary Examiner.*

U.S. Cl. X.R.

166—297; 175—16